Oct. 18, 1949.  A. D. McPHERSON ET AL  2,484,900
WHEEL FAIRING LOCK AND RELEASE
Filed Oct. 11, 1946  2 Sheets-Sheet 1
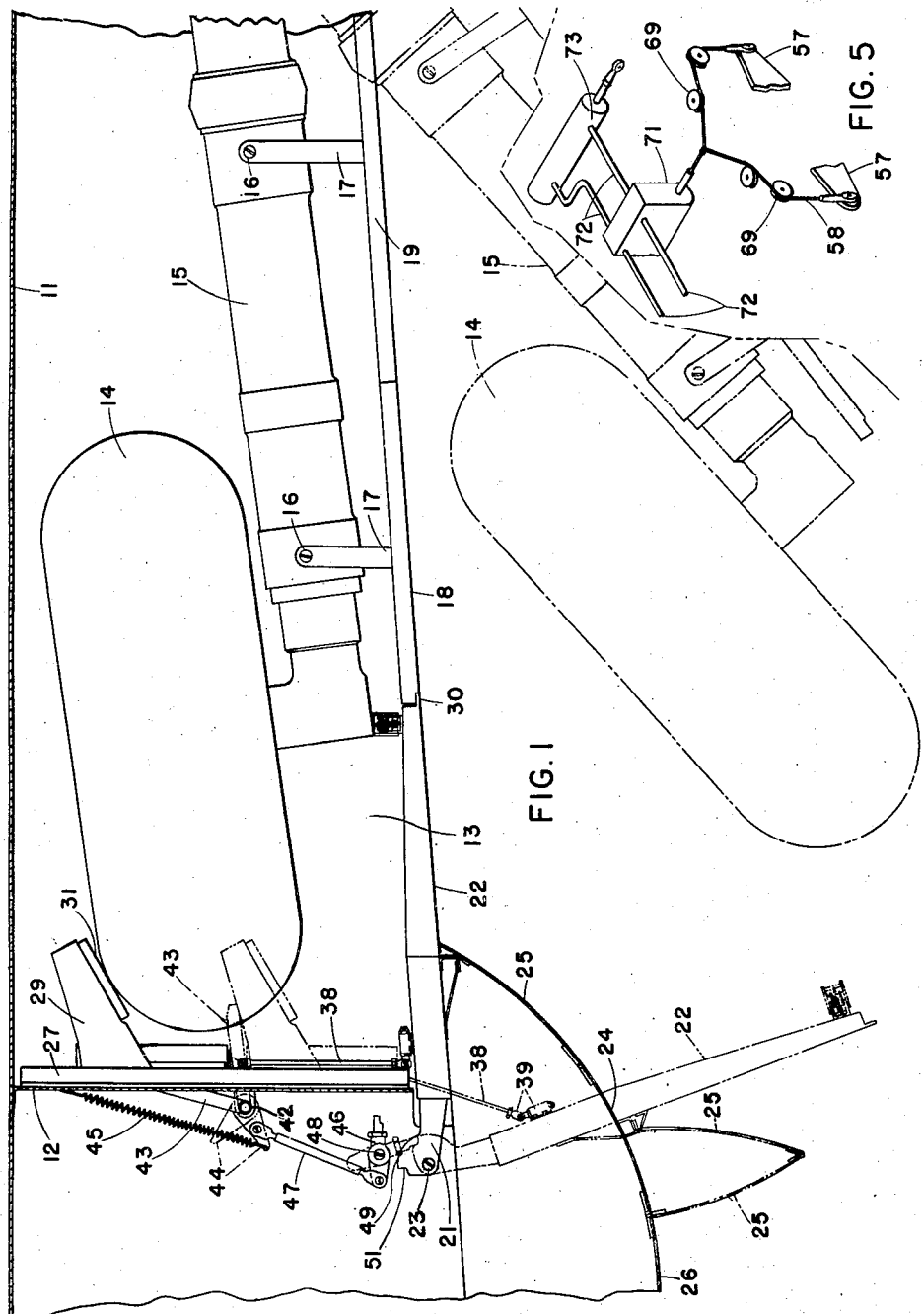
INVENTORS
ARTHUR D. McPHERSON
ROBERT M. DALTON
RICHARD C. SMITH
BY
*Richard W. Treverton*
ATTORNEY Oct. 18, 1949.  A. D. McPHERSON ET AL  2,484,900
WHEEL FAIRING LOCK AND RELEASE
Filed Oct. 11, 1946  2 Sheets-Sheet 2
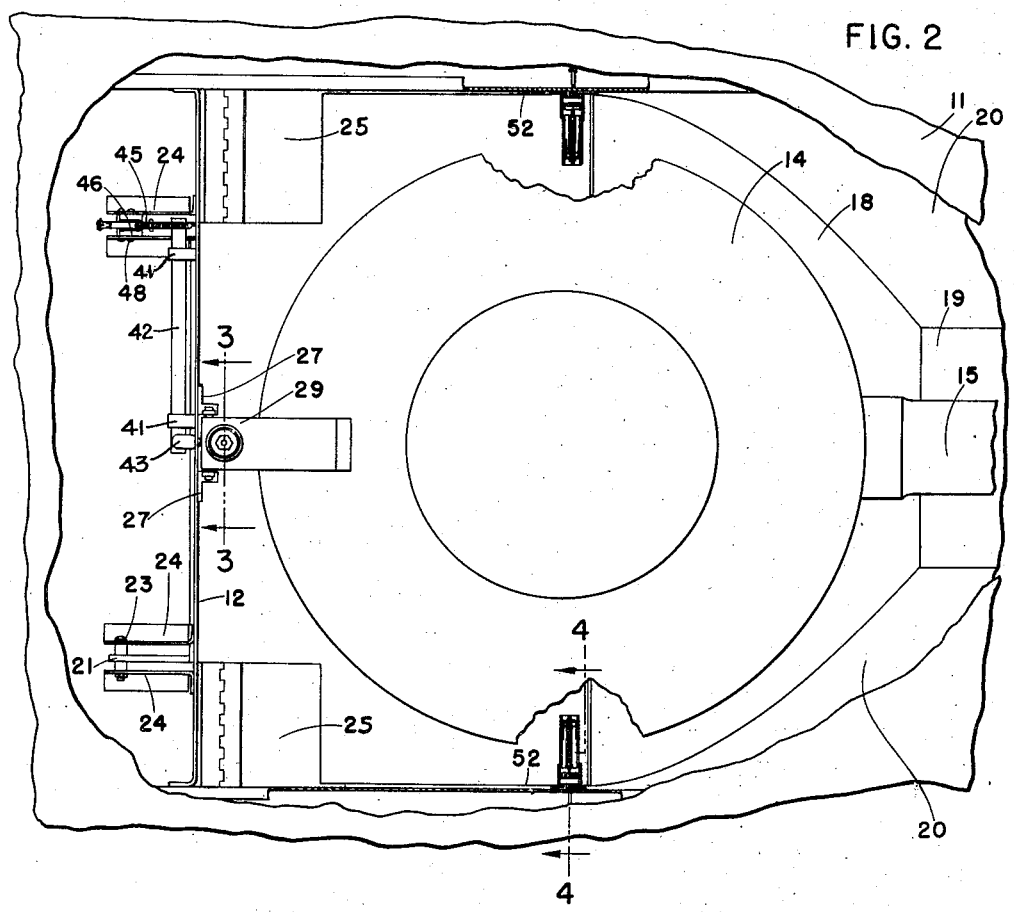
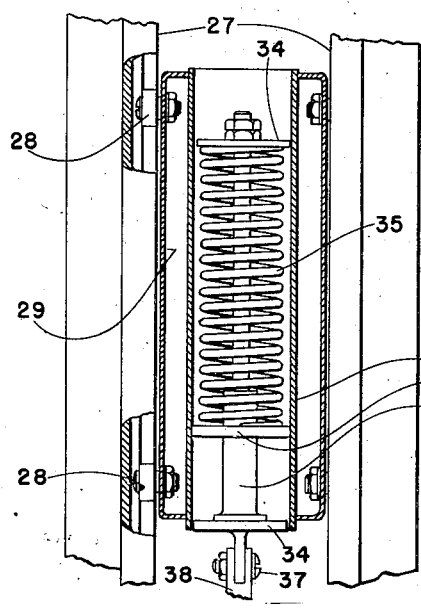
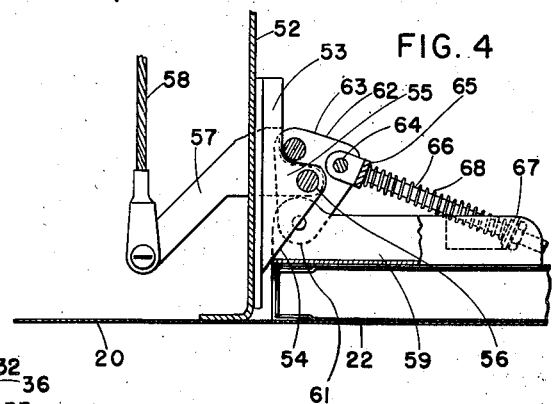
INVENTORS
ARTHUR D. McPHERSON
ROBERT M. DALTON
RICHARD C. SMITH
BY
Richard W. Treverton
ATTORNEY Patented Oct. 18, 1949

2,484,900

UNITED STATES PATENT OFFICE 2,484,900

WHEEL FAIRING LOCK AND RELEASE

Arthur D. McPherson, Snyder, Robert M. Dalton, Williamsville, and Richard C. Smith, Snyder, N. Y., assignors to Curtiss-Wright Corporation, a corporation of Delaware Application October 11, 1946, Serial No. 702,598

9 Claims. (Cl. 244—102)

This invention relates to fairing for the retractable landing gear of aircraft and particularly to improved means for opening and closing such fairing, and for retaining the same in open and closed positions.

In the design of high speed aircraft it has become the practice to retract the landing gear into a well provided in the wings or fuselage, and to provide fairing or closure means for the well which may be opened to allow extension or retraction of the gear, the fairing being arranged to present a smooth surface to the airstream over the well when in closed position. It is desirable that such fairing open and close automatically in order that the aircraft pilot will not be burdened with additional operations. Heretofore it has been known to hinge fairings or fairing sections to the aircraft, and to connect them to the landing gear for opening and closing movements in response to extension and retraction of the gear. Difficulties have been encountered with such arrangements, however, due to small variations in retractive movements of the gears, which at times has caused improper or incomplete closure of the fairing resulting in undesirable aerodynamic drag upon the aircraft; and also, due to the airstream tending to partially open the fairing, particularly at high speeds, the fairing has moved to a partially open position which likewise results in increased aerodynamic drag upon the aircraft.

The present invention provides simple and light-weight fairing operating means, actuated automatically by the landing gear mechanism, and provided with means to insure the complete closure of the fairing upon gear retraction, and with means effective upon such closure to positively hold or lock the fairing tightly closed. Locking or holding means are also provided for holding the fairing in fully open position when the gear is extended, such means being automatically operated by the fairing operating means.

The foregoing and other objects and advantages will become apparent from the following description of the typical embodiment of the invention shown in the accompanying drawings, wherein:

Fig. 1 is a front view of the wheel fairing and associated landing gear parts applied to an aircraft, certain structural parts of the latter appearing in section, the fairing and landing gear parts being shown by full lines in the closed position and by broken lines in an opening position thereof;

Fig. 2 is a top plan view of the structure shown in Fig. 1, with parts broken away to illustrate the parts therebeneath;

Fig. 3 is a fragmentary vertical section taken substantially along line 3—3 of Fig. 2;

Fig. 4 is a detail vertical section taken substantially along line 4—4 of Fig. 2 showing means for locking a fairing section in closed position; and, Fig. 5 is a diagrammatic illustration of means for releasing the lock of Fig. 4.

As shown in Fig. 1 the aircraft wing comprising an upper wall 11 and a bulkhead 12 is provided with a well 13 for receiving a landing gear assembly including wheel 14 and strut 15 in the retracted position of the assembly shown in full lines. The strut 15 may be pivoted by suitable means whereby the assembly may be swung to an extended position in which the strut is substantially upright. An intermediate position of the assembly, such as would occur during retraction or extension of the landing gear is indicated by the broken lines of Fig. 1. Pivoted to the strut at 16 are brackets 17 carried by fairing sections 18 and 19 for covering the portions of the well which receive the upper half of wheel 14 and the strut 15. As may be seen in Fig. 2 the fairing sections 18 and 19 complement the adjacent portions of bottom wall 20 of the wing to provide a substantially continuous lower surface for the wing when in closed position. In extension of the landing gear the fairing sections 18 and 19 swing downwardly with the strut as shown in broken lines in Fig. 1.

A fairing section 22, for closing the portion of the well receiving the lower half of the wheel, has arms 21 pivoted at 23 to a fixed part of the aircraft, which may comprise brackets 24 secured to bulkhead 12 as shown in Fig. 2. Section 22 may swing about pivots 23 between the closed position shown in full lines, and the open position shown in broken lines, in Fig. 1, carrying with it hinged sections 25 the lower of which is shown as hinged to part 26 of the belly of the fuselage. The outboard end of the section 22 may have a flange 30 underlying the inboard end of fairing section 18 in the closed relation of the parts.

Secured to bulkhead 12 are vertical tracks 27 for rollers 28 of a carriage 29 which has another roller, 31, engageable by the tire of wheel 14 as the latter approaches retracted position. The carriage includes a guide tube 32 for a unit resiliently supported therein comprising a shank 33 with collars 34, a coil spring 35 being confined between the upper collar 34 and a web 36 extended across tube 32. To the lower end of the shank there is pivoted at 37 a link 38 which is connected by a swivel pivot fitting 39 to fairing section 22.

From the foregoing description it will be understood that as the landing gear moves from extended to retracted position, the tire of wheel 14 will engage roller 31 of the carriage and move the latter upwardly on tracks 27, the link 38 swinging the fairing section about pivot 23 to its closed position. The parts are so proportioned that the landing gear assembly overtravels the fairing section 22, such overtravel being permitted by spring 35 which is compressed during the terminal phase of landing gear retraction and thereafter resiliently retains the section 22 in fully closed position. During extension of the landing gear the carriage 29 and fairing section 22 will drop to open position by gravity as rapidly as descent of the wheel 14 permits, but in the event such opening movement should lag the wheel 14 will engage the fairing and move it to at least partially open position.

The means for locking the fairing section 22 in open position will now be described. Journalled in bearing 41 supported by bulkhead 12 is a rock shaft 42 having an arm 43 engageable with carriage 29 and an arm 44 connected by a tension spring 45 to a fixed part of the aircraft, such as 12. Arm 44 is pivotally connected to a latch 46 by a link 47, the latch being pivoted at 48 to one pair of brackets 24 as shown in Fig. 2. The adjacent arm 21 of fairing section 22 has a rounded face 49 terminating in a detent 51 engageable by the latch 46 in one position thereof (the broken line position of Fig. 1).

The operation of the fairing section open position lock means is as follows: As the carriage 29 moves upwardly as a result of retraction of the landing gear, the arm 43 is swung upwardly, moving arm 44 downwardly against the resistance of spring 45 and swinging the latch 46 away from detent 51 in fairing section arm 21. Because the spring 35 of the carriage 29 allows the latter to move in advance of the fairing section 22, the latch is removed from the detent before any positive closing movement is applied to the fairing section. As the landing gear is extended and the carriage 29 descends, the spring 45 will cause the arm 43 to follow the carriage, swinging the arm 43 clockwise. This motion imparted to the latch will move the latter into engaged relation to the detent 51, where it will remain by reason of the tension of spring 45 to lock the fairing section 22 fully open. It will be noted that should the opening movement of the fairing section 22 by gravity lag behind extension movement of the landing gear, partial opening resulting from wheel 14 moving the fairing will lower the carriage 29 to a position wherein the arm 43 engages the upper surface of the carriage, so that the spring 45 will urge continued down movement of the carriage and fairing assembly, to bring the fairing to fully opened position.

The means for locking the fairing section 22 in closed position will now be described. There is secured to each of structural members 52 of the wing that constitute the fore and aft walls of the wheel well, a latch keeper 53 having an inclined cam surface 54 rounding into a cam detent surface 55. Pivoted to keeper 53 at 56 is a latch release arm 57 which extends through a slot in member 52 and is connected to a latch release cable 58. Secured to the fairing section 22 adjacent each latch keeper 53 is a bracket 59 to which are pivoted at 61 a pair of plates 62 connected by a latch pin 63 and a pivot pin 64. The latter extends through a bifurcated member 65 secured to one end of a guide rod 66 whose opposite end extends through an opening in a web 67 of bracket 59. Supported by the rod 66 and compressed between member 65 and web 67 is a coil spring 68 which urges the unit 62, 63, 64 counterclockwise about pivot 61 to hold the latch pin 63 on detent surface 55 of fitting 53. Arm 57 is provided with a shoulder 68 engageable with the latch pin, whereby the spring 68 will normally hold the arm in the position thereof shown in Fig. 4.

The operation of the means for locking the fairing section 22 in closed position is as follows: As the fairing section moves from open position to the closed position shown in Figs. 2 and 4, the latch pin will ride over the cam surface 54 of keeper 53 and be pressed onto the cam detent surface 55 by action of the spring 68 which will thereupon retain the fairing section tightly locked to the aircraft until release is effected. In order to release the lock, the cable 58 is pulled upwardly, swinging the arm 57 clockwise about its pivot 56, moving the latch pin 63 beyond the detent surface 55, whereupon the section 22 is freed for opening movement by the means hereinbefore described.

A preferred method of operating the cables 58 to release the latch means just described is shown diagrammatically in Fig. 5. As there shown the cables 58 may extend over suitably arranged pulleys 69 to the piston rod of an hydraulic selector unit 71 connected in the hydraulic lines 72 extending to the hydraulic actuating motor 73 for the landing gear retraction mechanism. It will be understood that the actuating motor 73 is connected by suitable means to the strut 15 for moving the latter between extended and retracted position. The specific connecting means form no part of the present invention and for this reason are not illustrated. The details of the unit 71 also form no part of the invention, the same being well known in the art. Suffice it to say that as the hydraulic system is activated for causing the cylinder 73 to retract the landing gear, the piston rod of unit 71 will be retracted, releasing the latch means shown in Fig. 4 before the activating fluid passes to the cylinder 73 to move the strut 15 from its retracted position.

It will be understood that the structure and arrangement of parts herein shown and described are merely illustrative of a preferred embodiment of the inventive principles involved, and that these principles may be utilized in other physical forms without departing from the spirit of the invention or the scope of the appended claims.

We claim:

1. In an aircraft having a well for receiving a retractable landing gear assembly in the retracted position thereof, a carriage mounted upon a track in said well and adapted for movement in response to movement of said assembly into and from said well, a fairing member for closing the well pivoted to the aircraft, means providing a resilient connection between the carriage and said member for swinging the latter between open and closed positions in response to movements of said carriage, the resilience of said connection enabling limited movement of the carriage when said member is held against movement in open position, means for locking said member in open position including resilient means for holding the locking means in applied position, and means responsive to movement of the carriage for releasing the locking means when said assembly is moved into retracted position.

2. In an aircraft having a well for receiving a retractable landing gear assembly in the retracted position thereof, a carriage mounted upon a track in said well for movement in response to movement of said assembly into and from said well, a fairing member for closing the well pivoted to the aircraft, means providing a resilient connection between the carriage and said member for operating the latter between open and closed positions thereof, the resilience of said connection enabling limited movement of the carriage when said member is held against movement in open position, means for locking said member in open position, and means responsive to movement of the carriage for releasing the locking means.

3. In an aircraft having a retractable landing gear, a carriage movable in the aircraft in response to movement of said gear into and from retracted position, a landing gear fairing member adapted for opening and closing movement, means resiliently connecting the carriage and said members for closing the latter upon movement of the carriage in response to retraction of the gear, the resilience of said connection enabling limited movement of the carriage when said member is held against movement in open position, means for holding said member in open position, and means responsive to the last mentioned movement of the carriage for releasing the holding means.

4. In an aircraft having a well for receiving a retractable landing gear in the retracted position thereof, a carriage mounted upon a track in said well for abutment and movement by the gear during retractive movement of the latter, a movable closure for the well, and a resilient connection between the carriage and closure for closing the latter upon said movement of the carriage.

5. In an aircraft having a well for receiving a retractable landing gear in the retracted position thereof, means disposed in said well for abutment and movement by the gear during retractive movement of the latter into said well, a movable closure for the well, and a resilient connection between the movable means and the closure for closing the latter upon such movement of the first mentioned means, the gear and said movable means being arranged to overtravel the closure whereby the resilient connection will urge retention of the closure in closed relation to the well when the gear is retracted.

6. In an aircraft having a well for receiving a retractable landing gear, a closure for the well pivoted to the aircraft, means including a reciprocable member resiliently connected to the closure for swinging the same between open and closed positions, a latch for holding the closure in open position, a latch operating member pivoted to the aircraft and connected to the latch, said member having a part engageable with the reciprocating member, and resilient means for moving the latch operating member to apply the latch as the reciprocating member moves to closure opening position.

7. In an aircraft having a retractable landing gear, a fairing for the gear pivoted to the aircraft, means including a reciprocable member resiliently connected to the fairing for swinging the same between open position to receive the gear and closed position to cover the gear when the latter is retracted, a latch for holding the fairing in open position, a latch operating member pivoted to the aircraft and operably connected to the latch, said member having a part engaged by the reciprocating member upon fairing closing movement thereof for releasing the latch.

8. In an aircraft having a retractable landing gear and a well for receiving the gear when in retracted position, means for operating the gear between extended and retracted position, a member for closing the well pivoted to the aircraft, operating means for said member engageable and movable by the gear during movement into and from retracted position for respectively closing and opening said member, a latch for holding said member open and means actuated by said closure member operating means for releasing the latch as the gear is retracted, another latch for holding said member closed, and means associated with the first mentioned means for releasing said other latch prior to movement of the gear from retracted position.

9. In an aircraft having a retractable landing gear, a member movable between an open position and a closed position covering a portion of the gear when the latter is retracted, means within the aircraft engageable and movable by the gear during retractive movement of the gear for closing said member, said means being connected to the member by a resilient connection whereby said means may have limited movement when the member is held against movement, latch means for holding said member in open position, and means actuated by the first mentioned means upon initial movement thereof during gear retraction for releasing the latch means.

ARTHUR D. McPHERSON.
ROBERT M. DALTON.
RICHARD C. SMITH.

REFERENCES CITED

The following references are of record in the file of this patent:

UNITED STATES PATENTS

| Number | Name | Date |
|---|---|---|
| 1,834,254 | Reid | Dec. 1, 1931 |
| 2,184,057 | Parker | Dec. 19, 1939 |
| 2,415,615 | Wallace | Feb. 11, 1947 |

FOREIGN PATENTS

| Number | Country | Date |
|---|---|---|
| 691,667 | Germany | June 3, 1940 |
| 700,136 | Germany | Dec. 13, 1940 |